United States Patent [19]
Werner et al.

[11] Patent Number: 5,820,159
[45] Date of Patent: Oct. 13, 1998

[54] ASSEMBLY FOR AN AIRBAG MODULE

[75] Inventors: Heribert Werner, Kahl; Stefan Bohn, Goldbach, both of Germany

[73] Assignee: TRW Automotive Safety Systems GmbH, Aschaffenburg, Germany

[21] Appl. No.: 844,966

[22] Filed: Apr. 23, 1997

[30] Foreign Application Priority Data

Apr. 27, 1996 [DE] Germany ................ 196 16 941.0

[51] Int. Cl.⁶ .................................................. B60R 21/16
[52] U.S. Cl. ...................................... 280/728.2; 280/732
[58] Field of Search ............................... 280/732, 728.2, 280/728.1

[56] References Cited

U.S. PATENT DOCUMENTS

| | | | |
|---|---|---|---|
| 3,904,222 | 9/1975 | Bursott et al. | 280/732 |
| 5,186,492 | 2/1993 | Wright et al. | 280/728.2 |
| 5,445,407 | 8/1995 | Lotspih | 280/728.2 |
| 5,484,163 | 1/1996 | Jenkins | 280/732 X |
| 5,613,704 | 3/1997 | White, Jr. et al. | 280/728.2 X |

FOREIGN PATENT DOCUMENTS 4228232  8/1992  Germany .

*Primary Examiner*—Christopher P. Ellis
*Attorney, Agent, or Firm*—Sprung Kramer Schaefer & Briscoe

[57] ABSTRACT

An assembly for manufacturing an airbag module for the passenger seat in a motor vehicle having a tubular element that accommodates a cylindrical reservoir of compressed gas and two identically shaped frontal components in the form of segments of extruded section that can be forced like hose clips against the tubular element such as to laterally demarcate space for accommodating a folded airbag against the tubular element. The upper area of the frontal components in one embodiment is openwork. Auxiliary tubes can be tensioned between the frontal components. A web of material that wraps around the tubular element can be secured to the auxiliary tubes, laterally demarcating the space for accommodating the airbag paralleling the axis of the tubular element.

13 Claims, 5 Drawing Sheets

ASSEMBLY FOR AN AIRBAG MODULE

BACKGROUND OF THE INVENTION

The present invention concerns a subassembly for an airbag module for the passenger seat in a motor vehicle.

Airbag modules for passenger seats in motor vehicles are increasingly being offered for sale as options and even as original equipment by the automotive industry. Considerable efforts are on the other hand being made to rationalize the manufacture of automobiles in order to remain internationally competitive. This means that accessory passenger-seat airbags must be provided as cheaply as possible.

The result is that an assembly of the aforementioned genus must be designed as ideally as possible from the aspects of materials, manufacture, and installation.

SUMMARY OF THE INVENTION

This object is attained in accordance with the present invention in an assembly characterized by a tubular element that accommodates a cylindrical reservoir of compressed gas and by two identically shaped frontal components in the form of segments of extruded section or sheetmetal stampings that can be forced like hose clips against the tubular element such as to laterally demarcate space for accommodating a folded airbag inside the tubular element.

The present invention derives from the realization that the major assembly of an airbag module, specifically the airbag and the compressed-gas reservoir, does not absolutely need to be accommodated in a totally closed housing but that it is sufficient to provide space for the folded bag above the reservoir that will not interfere with the bag's function and that will be enclosed by as little material as possible.

When an airbag is inflated, it is of advantage for the gas, which must be released all at once, to flow into the folded bag through as large an opening as possible. This purpose requires a gas-forwarding system that will distribute the gas, which exits through a narrow burst outlet opening, over a wide channel cross-section. All conventional passenger-seat airbag reservoirs accordingly feature components with many outlet openings between them and the bag's gas intake. These components are either part of the housing wall or separate inserts.

This aspect of the airbag's function is realized in the present invention by the tubular element that surrounds the reservoir, that includes the aforementioned outlet openings, and that, as a fundamental component of the assembly, provides stability for the form and shape of the overall system.

The frontal components are in the form of slotted segments of extruded section positioned co-axial with the tubular element and can be forced against it like hose clips. The airbag itself can be fastened to the tubular element. The frontal components also laterally demarcate space for accommodating a folded airbag above the tubular element.

The most essential characteristics of the assembly in accordance with the present invention are accordingly defined. These characteristics are cost-effective and ensure very easy installation.

Modifications, expansions, and advanced versions of this basic embodiment are addressed in claims 2 through 13. The present invention will now be specified with reference to the accompanying drawing, wherein

DETAILED DESCRIPTION OF THE INVENTION

Figure 1:
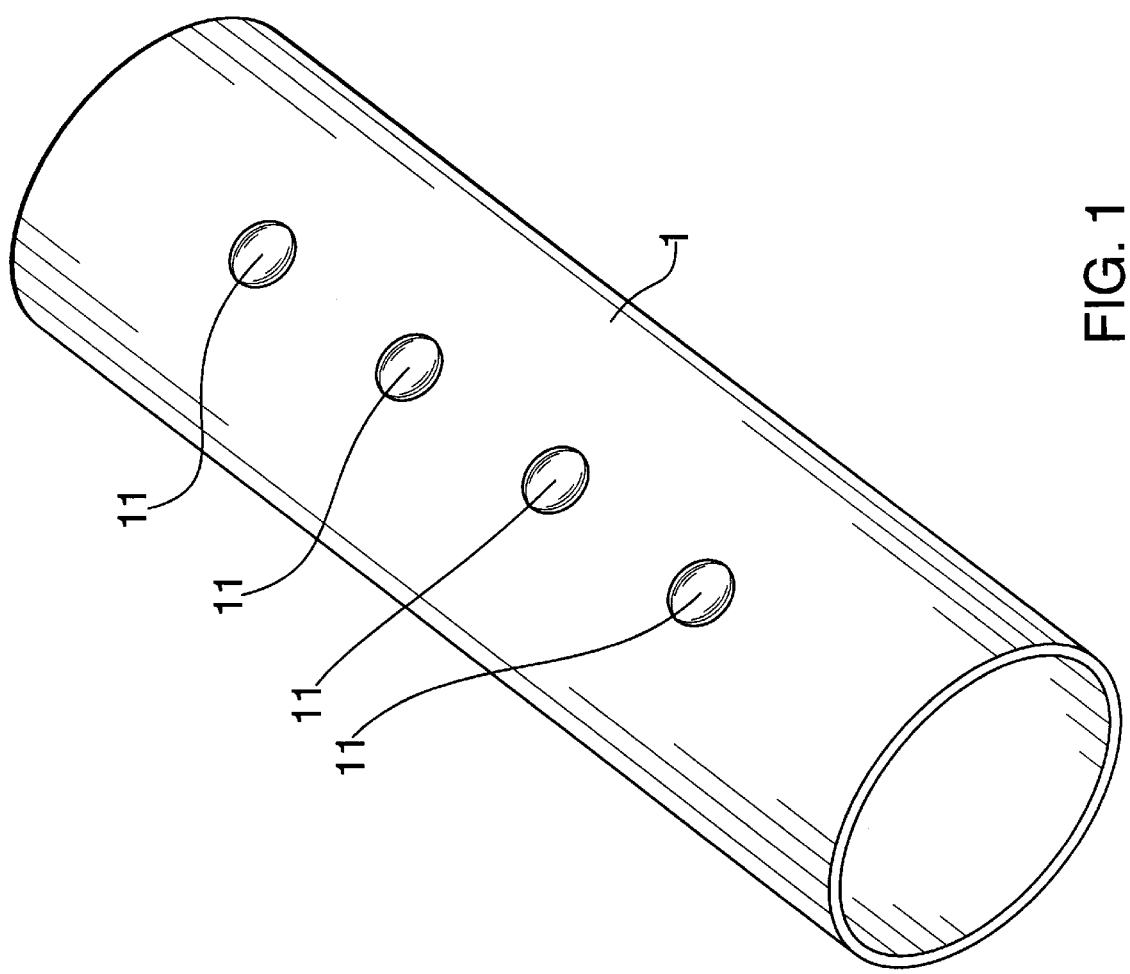
FIG. 1 is a perspective view of a tubular element.
Figure 4:
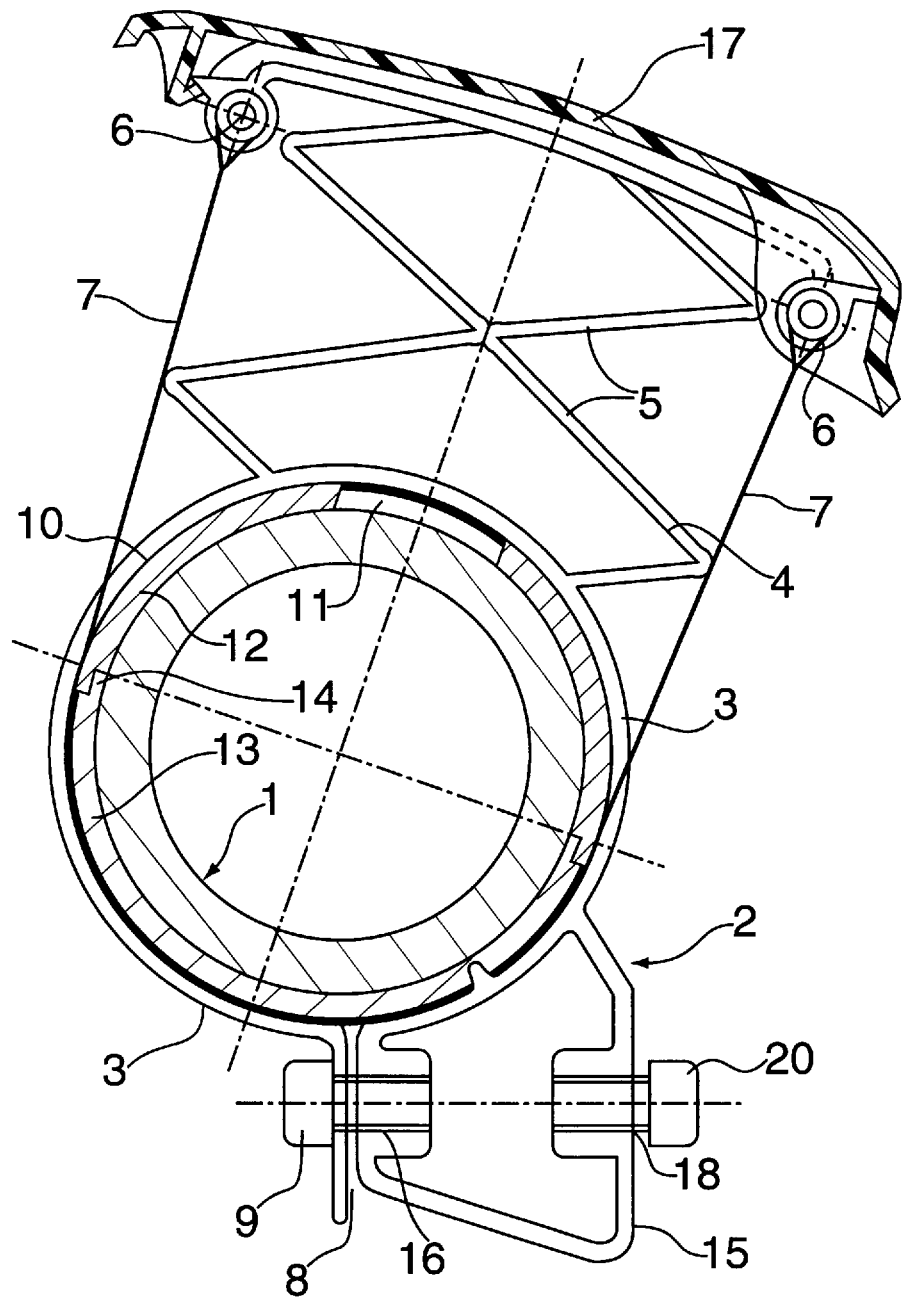
FIG. 4 is a transverse section through an assembly without a compressed-gas reservoir but with a cap.
Figure 5:
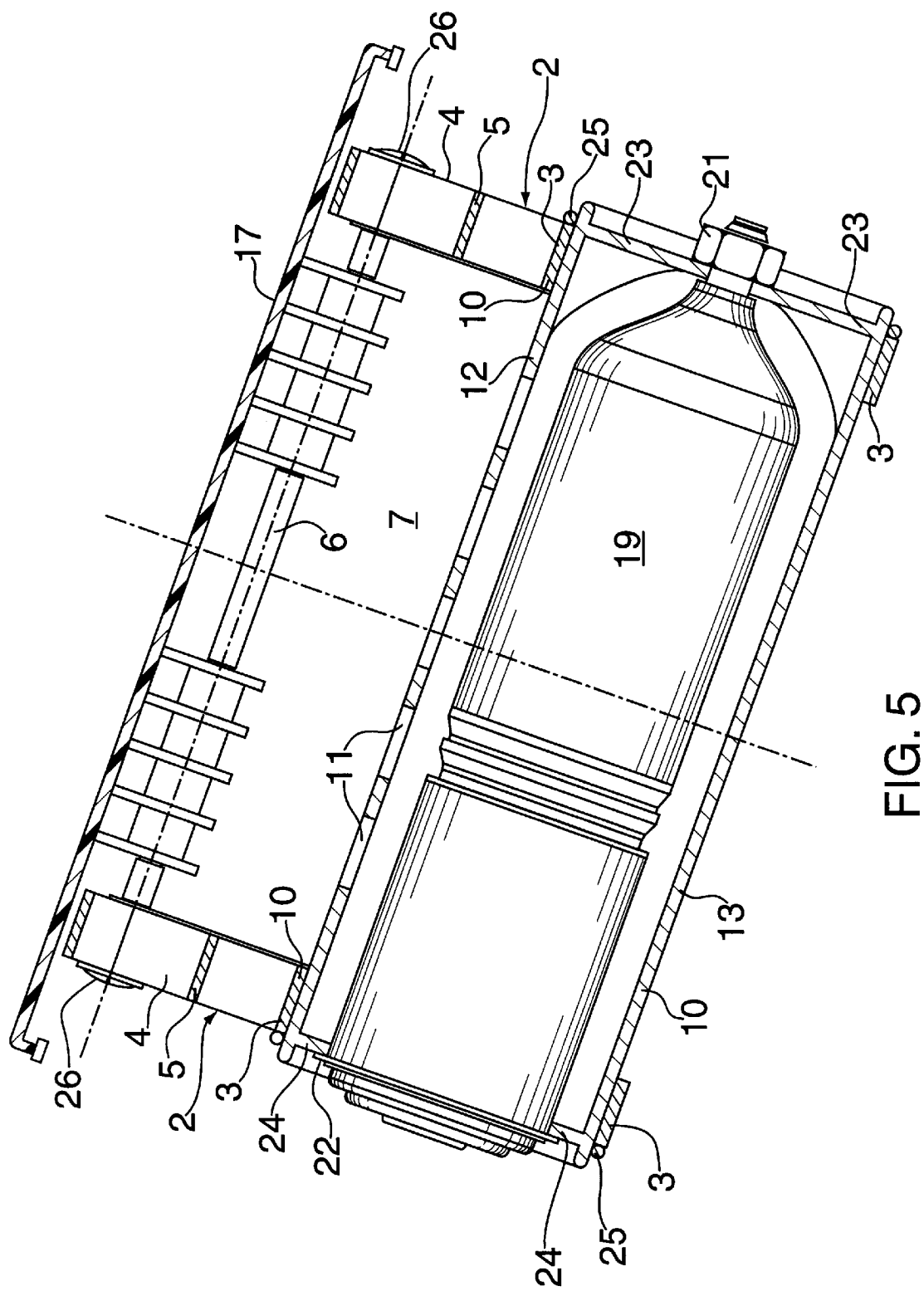
FIG. 5 is a longitudinal section through the same assembly with a compressed-gas reservoir.

The tubular element 1 illustrated in FIG. 1 is wide and long enough to accept a compressed-gas reservoir (item 19 in FIG. 5). It has many outlet openings 11. The diameter and distribution of outlet openings 11 depends on the particular application. Depending on how the reservoir is to be secured inside tubular element 1, the tubular element can be in one part or in two halves with a seam paralleling its axis (cf. FIG. 4). In the latter event the two frontal components also hold the halves together securely.

Figure 2:
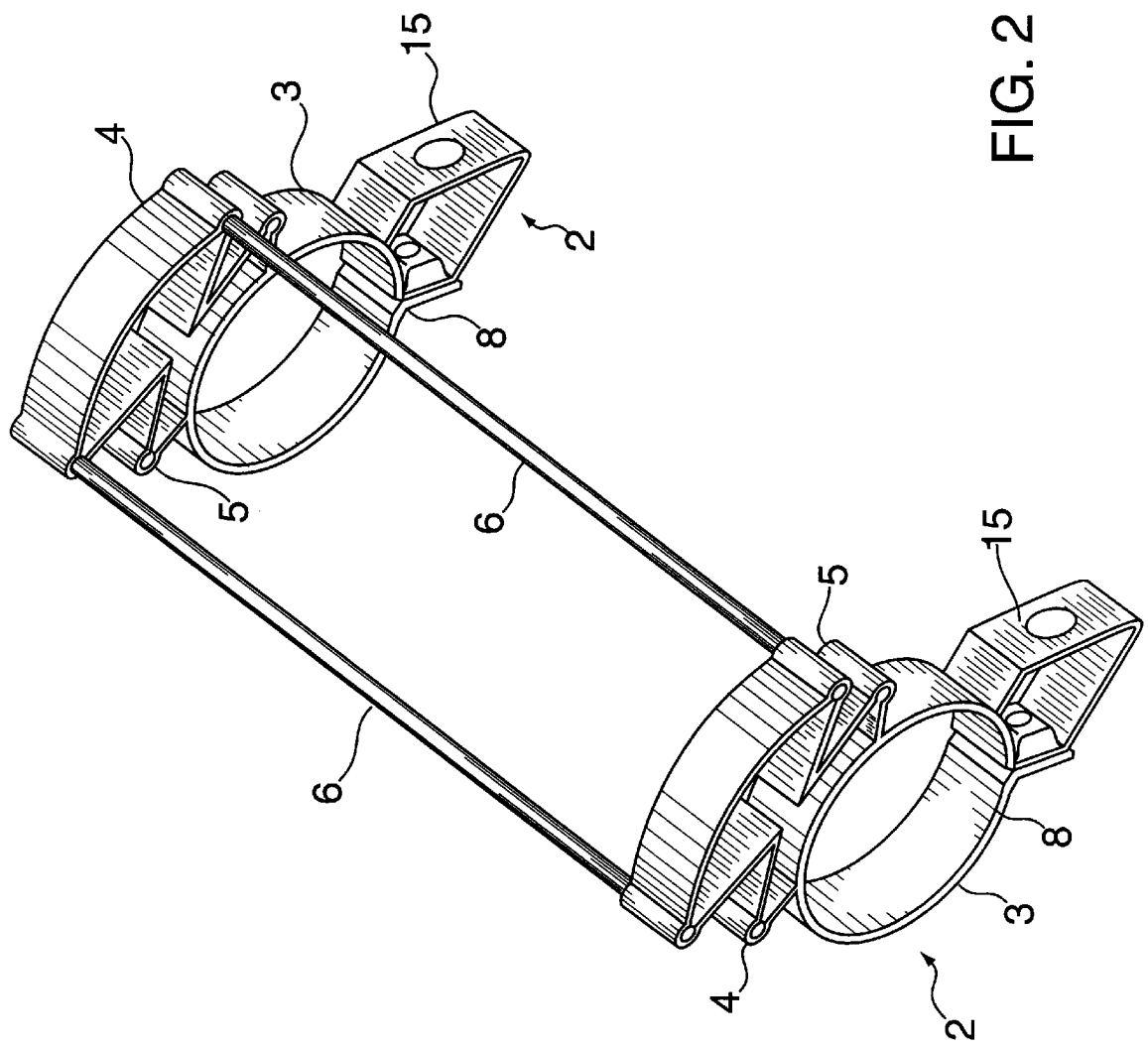
FIG. 2 illustrates two frontal components accompanied by auxiliary tubular elements.

The frontal components 2 illustrated in perspective in FIG. 2 are segments of extruded section, the longitudinal axis of which parallels that of the tubular element. Each frontal component 2 comprises an area 3 that secures one end of tubular element 1 and an area 4 that extends radially out therefrom to an extent that at least matches the width of space for accommodating an airbag folded against the tubular element's projection surface. The space is accordingly demarcated longitudinally with no need for an uninterrupted housing. Much material can be spared and the section still be thick enough to provide all the strength needed at this point. The component can for example be openwork. Such a design can take into account various aspects of the energy conversion that occurs as the result of plastic deformation in the event of sudden stress perpendicular to the axis of the tubular element. Another free parameter, finally, is available in the form of the width of the segments of section. The frontal components accordingly provide the designer with a wide range of ways to adapt the assembly in accordance with the present invention to various constraints.

FIG. 2 illustrates the two frontal components 2 held together by auxiliary tubes or solid rods 6. The areas that accommodate the airbag are provided with accommodations for rods 6. The rods can be bent into frontal components 2 or secured in them by appropriate means. The frontal components, each of which accommodates a slot 8, are as far apart as the ends of the particular tubular element. The auxiliary tubes or rods 6 can be secured in frontal components 2 such that the distance between the frontal components can be varied either on its own or by means of the rods.

Frontal components 2 are also provided with fasteners 15 for installing the airbag in a vehicle. Fasteners 15 can also be adapted to various needs to the extent that such adaptations can be produced by extrusion.

Figure 3:
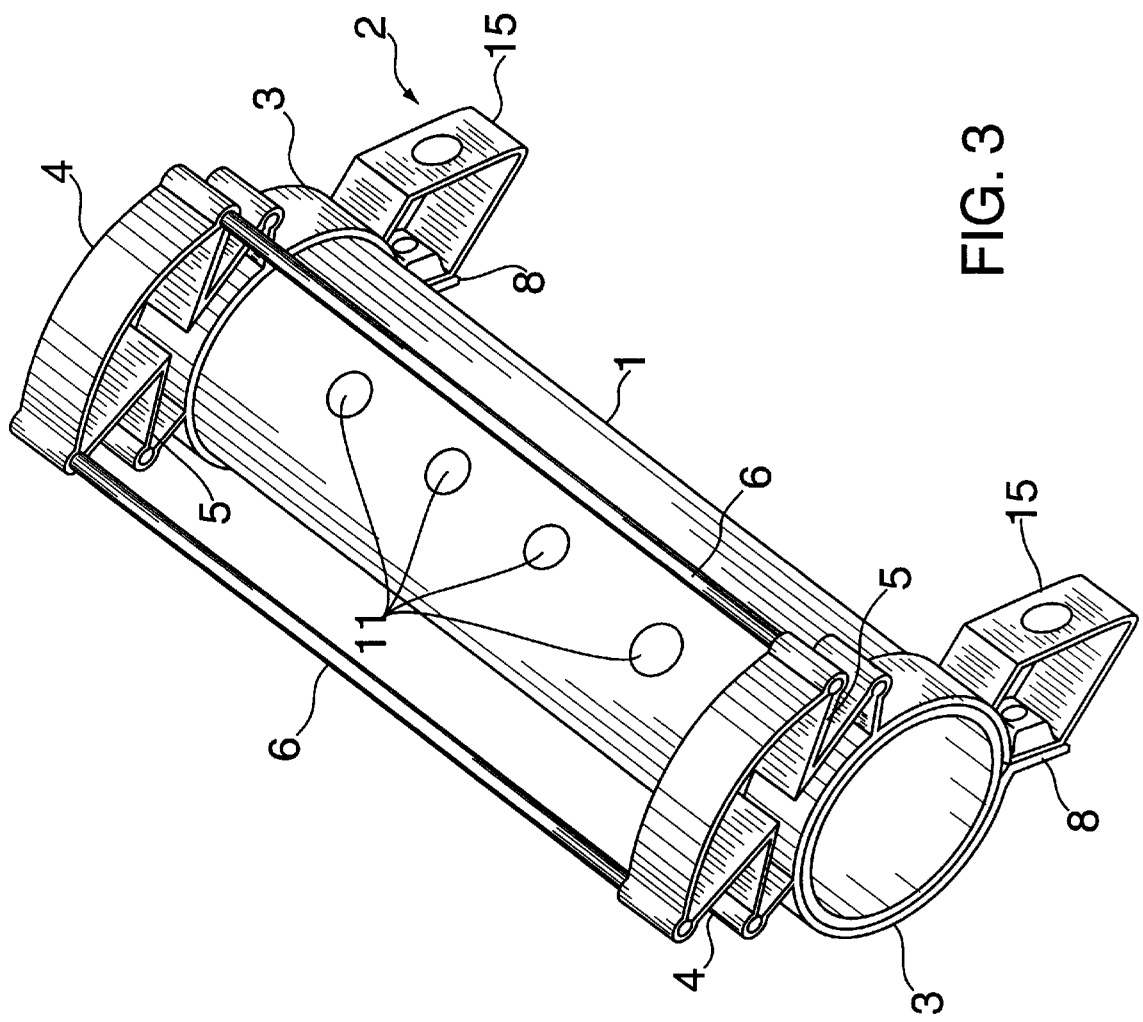
FIG. 3 illustrates an assembly with a tubular element, frontal components, and auxiliary tubes.

FIG. 3 illustrates the components illustrated in FIGS. 1 and 2 assembled. The illustration is in itself entirely comprehensible and requires no discussion.

FIG. 4 is a transverse section through a tubular element 1 comprising two halves 12 and 13 joined together at a seam 14. The areas 3 on frontal components 2 are wrapped around tubular element 1. Slot 8 can be narrowed by turning a screw 9, forcing halves 12 and 13 together into a single component and an airbag 10 against tubular element 1. Half 12 accommodates outlet openings 11 that conventionally slightly constrict the gas leaving the reservoir and distribute the gas over the cross-section of the bag's intake.

Adjacent to the area 3 that is uppermost in the figure is an area 4 of openwork 5 that demarcates space for airbag 10. The top of area 4 is provided with accommodations for auxiliary tubing or rods 6. These accommodates subject to tension a web 7 of material that wraps around tubular element 1 and laterally demarcates space for accommodating the airbag.

Auxiliary tubes or rods 6 can also function as articulations for a cap 17, the other side of which snaps into an accommodation extruded into frontal components 2.

Frontal components 2 are provided at the bottom with fasteners 15 for securing the airbag module in the vehicle. An accordingly thicker section of each fastener 15 accommodates bores 18 that accept, preferably tapping, screws 20. Bores 18 are preferably located where they can be produced simultaneously with the bores 16 that accept the screws 9 applying force to frontal components 2 and tubular element 1.

FIG. 5 is a longitudinal section through the structures illustrated in FIG. 4 accommodating a compressed-gas reservoir 19. Halves 12 and 13 are provided with flange-like elevations 23 and 24, between which reservoir 19 can be tensioned. Reservoir 19 itself can help stabilize the final assembly, sparing even further material.

Airbag 10 wraps around tubular element 1 and is secured to it by the areas 3 of frontal components 2, which accordingly act like hose clips. The folded part of airbag 10 is for simplicity's sake not illustrated at the top. Airbag 10 is prevented from slipping out of its accommodation by two continuous rings 25.

Upper half 12 is provided with outlet openings 11 for the gas. The upper areas 4 are openwork 5 and accommodate the ends of auxiliary tubes or rods 6, by screws 26 in the illustrate embodiment. The web 7 of material wrapped around tubular element 1 is also fastened section by section to auxiliary tubes or rods 6. Cap 17 pivots between the sections.

What is claimed is:

1. An assembly for manufacturing an airbag module for the passenger seat in a motor vehicle, comprising: a tubular element for accommodating a cylindrical reservoir of compressed gas and two identically shaped frontal components in the form of segments of extruded section or sheet-metal stampings that are mounted on the tubular element and spaced apart to laterally demarcate a space for accommodating a folded airbag against the tubular element.

2. The assembly as in claim 1, wherein the frontal components have a first portion that encloses the tubular element and a second portion that extends radially out therefrom to an extent that at least matches the width of the space for accommodating an airbag folded against a projection surface of the tubular element.

3. The assembly as in claim 1, wherein the second portions of the frontal components that extend radially out from the tubular element comprise an easily deforming openwork along a length thereof.

4. The assembly as in claim 1, further comprising two auxiliary tubes that are tensioned axially paralleling and separated from the tubular element and between the frontal components and a web of material wrapped around the tubular element and secured to the auxiliary tubes to laterally demarcate the space for accommodating the airbag paralleling the axis of the tubular element.

5. The assembly as in claim 1, wherein each frontal component has a slot which is resiliently forced against the tubular element by screws.

6. The assembly as in claim 5, wherein the airbag is forced against the tubular element by the frontal components.

7. The assembly as in claim 1, wherein the tubular element has outlet openings for the compressed gas.

8. The assembly as in claim 7, wherein the tubular element comprises two halves joined at a seam that parallels the axis of the tube and is held together by the frontal components.

9. The assembly as in claim 1, wherein the frontal components have fasteners for securing the airbag module in the vehicle.

10. The assembly as in claim 9, wherein the fasteners have bores produced simultaneously with bores that secure the frontal components to the tubular element.

11. The assembly as in claim 4, wherein one of the auxiliary tubes constitutes a hinge for an airbag cap and the frontal components are configured for the cap to snap into in the vicinity of the other auxiliary tube.

12. The assembly as in claim 1, further comprising a protective cover that covers an exit from the airbag between the auxiliary tubes and that can be ripped out.

13. The assembly as in claim 1, wherein the frontal components are plastic or a light-weight metal alloy.

* * * * *